United States Patent [19]

Shaw et al.

[11] Patent Number: 5,737,505
[45] Date of Patent: Apr. 7, 1998

[54] TACTILE INTERFACE APPARATUS FOR PROVIDING PHYSICAL FEEDBACK TO A USER BASED ON AN INTERACTION WITH A VIRTUAL ENVIRONMENT

[75] Inventors: Christopher D. Shaw, Santa Cruz; Jack W. Wiley, Corralitos, both of Calif.

[73] Assignee: Haptek, Inc., Santa Cruz, Calif.

[21] Appl. No.: 729,310

[22] Filed: Oct. 15, 1996

Related U.S. Application Data

[63] Continuation of Ser. No. 371,497, Jan. 11, 1995, abandoned.
[51] Int. Cl.$^6$ ..................................................... G08B 3/100
[52] U.S. Cl. ............................................ 395/119; 395/99
[58] Field of Search .............................. 395/99, 119, 87, 395/85, 86, 97; 318/568.1, 568.11; 482/901; 273/438

[56] References Cited

U.S. PATENT DOCUMENTS

| | | | |
|---|---|---|---|
| 4,843,568 | 6/1989 | Krueger et al. | 382/100 |
| 5,104,119 | 4/1992 | Lynch | 482/901 |
| 5,185,561 | 2/1993 | Good et al. | 318/432 |
| 5,229,756 | 7/1993 | Kosugi et al. | 273/438 |
| 5,319,387 | 6/1994 | Yoshikawa | 273/438 |
| 5,381,158 | 1/1995 | Takahara et al. | 345/156 |
| 5,393,074 | 2/1995 | Bear et al. | 273/440 |
| 5,429,140 | 7/1995 | Burdeau et al. | 128/774 |
| 5,451,924 | 9/1995 | Massimino et al. | 340/407.1 |
| 5,459,382 | 10/1995 | Jacobus et al. | 318/568.11 |

OTHER PUBLICATIONS

Shimoga, Karun B.; *A Survey of Perceptual Feedback Issues in Dexterous Telemanipulation: Part II. Finger Touch Feedback*; 1993; pp. 271–279.
Kahaner, David; *Virtual Reality in Japan*; 1993; pp. 66–73.
Milanesi et al.; *Utilization of Stepping Motors in the Realization of a Prototype of Perceptive Glove with Feedback Force for Telerobotics*; 1993; pp. 634–637.
Stone et al.; *Virtual Reality and Telepresence*; 1991; pp. 3/1–3/6.
Ino et al.; *A Basic Study on the Tactile Display for Tele-presence*; 1992; pp. 58–62.
Bergamasco et al.; *Design Considerations for Glove-like Advanced Interfaces*; 1991; pp. 162–167.
Iwata, "Pen–based Haptic Virtual Environment", IEEE 1993, pp. 287–292.

*Primary Examiner*—Phu K. Nguyen
*Assistant Examiner*—Cliff N. Vo
*Attorney, Agent, or Firm*—Kenyon & Kenyon

[57] ABSTRACT

A tactile interface system which provides a method for entering user position into a virtual reality and providing tactile feedback from that virtual reality. This system will allow for the representation of the user limb position and enable the user to feel interactions with objects represented in the virtual reality. The system also provides for the recording of tactile information to accompany audio and visual recordings.

16 Claims, 7 Drawing Sheets

TACTILE INTERFACE APPARATUS FOR PROVIDING PHYSICAL FEEDBACK TO A USER BASED ON AN INTERACTION WITH A VIRTUAL ENVIRONMENT

This application continuation of application Ser. No. 08/371,497, filed Jan. 11, 1995, now abandoned.

BACKGROUND—FIELD OF INVENTION

This invention relates to devices with which the user feels and manipulates an artificial, computer-generated environment.

BACKGROUND—DESCRIPTION OF PRIOR ART

In current practice, users control computers and video games with keyboard, mouse, button, joystick controls and other devices that provide no tactile feedback. Regardless of the input device, the user cannot feel the effect of their actions on the computer, and must depend on visual or auditory response from the computer. We refer to such a user as being "tactily blind". Users have become accustomed to manipulating objects with a mouse, joystick or other device with no sense of feel, but if one stops to imagine the real world without the sense of touch it becomes evident there is a serious void between the real world and a simulated one.

In the entertainment industry, computer games are not called computer games but are called video games precisely because they depend solely on visual and audio feedback, as does a video or film. Attempts to realize the artificial world are called Virtual Reality (VR) and include such developments as head mounted devices (HMDs) and data gloves.

HMDs

HMDs include video goggles that attempt to provide the user with a wide field of view and the feeling of being immersed in a computer generated environment. Current manufacturers include Virtual I/O, Maxx Technologies, and Kopin. To further this impression of being inside the computer generated environment, HMDs have been fitted with tracking devices that sense the pitch, roll and yaw of the users head, enabling the computer to simulate these motions in the users view. One prominent problem with HMDs arises from the computational delays in reorienting the artificial environment in response to user head motions. These delays cause user nausea, dizziness and motion sickness. The National Academy of Science issued a report calling for improvements and changes in the computer hardware and software that generate virtual environments (Sep. 20, 1994). "... The equipment that a person must wear [. . . ] to receive information from the virtual world [. . . ] are in need of improvement. One concern is the discomfort and poor image quality of currently available head gear. The committee found that people using headgear often suffer from chronic fatigue, lack of initiative, drowsiness, and irritability or nausea when interacting with a virtual environment for long periods of time."

DATA GLOVES

Considerable efforts have been made to develop motion sensing gloves that the user wears, which enter the position of his or hands into the computer. The DataGlove by VPL Research, measurers the magnitude of finger flexation by measuring the amount of light that escapes from the scratched surface of a fiber optic strand attached to each finger. The PowerGlove by Abrahams/Gentile measures finger flexation by measuring the change in resistance of a piezoelectric strip in each finger. When position sensing gloves such as these are coupled with HMDs, the computer re-creates an image of the user's hands in the virtual reality presented in the goggles. There are computation delays similar to those mentioned above resulting in the users perceived hands moving a fraction of a second later than their actual hands. In addition to destroying the sense of reality, these delays can be very distracting if the user is attempting even moderately rapid tasks. A much more serious and fundamental flaw of these "virtual hands" is the fact that they are position sensing only, and do not enable the user to feel anything that he or she may be attempting to manipulate, i.e. the user is still tactily blind.

VIRTUAL REALTY TODAY

According to the National Academy of Science, the entertainment industry is proving to be the testing ground of virtual reality devices. "Despite the enthusiasm surrounding Virtual Reality (VR), a substantial gap exists between the technology available today and the technology needed to bring virtual environments closer to reality . . . " (NAS-Sep. 24, 1994)

In addition to being tactily blind and encumbered by computational delays, existing virtual reality systems are prohibitively expensive. The elaborate hardware and software required price them out of the normal home or video arcade markets. This high cost factor confines the few existing systems, such as Dactile Nightmare by Virtuality to limited specialized high-cost arcades.

While the problems of delay and expense may be resolved as computers rapidly become faster and cheaper, the current approach is fundamentally flawed in that their virtual worlds provide for no sense of touch. The importance of touch in creating a convincing reality cannot be overstated. Imagine a system that perfectly recreated your visual impression of the room in which you now sit. However, imagine that in this perfectly recreated room, your hands move right through the desk, the walls and this paper. Such a room seems unreal. Now, close your eyes and grab your desk. Touch convinces you that it is real.

THE SENSATION OF TOUCH IN VIRTUAL REALITY

A device exists which straps onto a player's chest, which allows him or her to "feel" laser blasts, blows, etc., generated by the game. The weakness of this system is that it is a simple, one-way information pathway that does not interactively link the user to the computer world.

Efforts to create an interactively tactile virtual reality constitute a very new field called "haptics." Although most developments in this field are too new for patents to have been granted, there is one patent (U.S. Pat. No. 5,185,561) for a virtual reality device which does give the user the ability to feel and manipulate models representing chemical bonds. While this is a significant breakthrough, it is still very primitive and flawed in that the forced feedback is limited to only one motion (twisting), the patent presents no method for locating the users hands in virtual space, and the device must be held and does not leave the users hands and arms free to interact with computer-generated objects.

There does exist a research device called the Phantom for which no patent has yet been granted. The Phantom user places his or her fingertip in a thimble-like fixture which traces his or her finger position and, using servo motors, provides resistance which allows the user to feel computer generated objects in 3-D computer generated space. While this represents an even further advance than the bond-twisting patent, it, too, is severely limited because it enters and effects only the point at the tip of a user's finger. For that reason, the body position of the user cannot be entered into the computer and the computer cannot specifically reorient a users limb. The user can "feel" things with only one finger, and can move that finger less than approximately eight inches in any direction.

OBJECTS AND ADVANTAGES

Accordingly, several objects and advantages of our invention are:

1. To provide a tactile interface system which allows the user to feel computer generated objects;
2. To provide a tactile interface system in which the user exerts tactile control over computer generated objects;
3. To provide a tactile interface system in which the user moves and exerts him or herself in a natural way;
4. To provide a system with which the user feels fully integrated into the virtual world;
5. To provide a high degree of interactivity (number of computer decision in response to user motions);
6. To provide a system in which there is no perceived computational delay between user action and virtual world responses;
7. To provide a relatively inexpensive system which can enter a much larger marketplace than existing VR devices;
8. To provide a system enabling a computer to accurately represent user limb positions in the computer generated world;
9. To introduce a body-tracing interface which allows unrestricted arm motions while following the motion of the body's limbs providing the computer with complete information regarding the user's body position;
10. To introduce a mechanism which provides feeling as the user contacts objects in the virtual world with no perceivable delay;
11. To provide a tactile environment including elements or characters which initiate their own motions or actions;
12. To provide a system which can record tactile sensations along with images.

DRAWING FIGURES

Figure 4A:
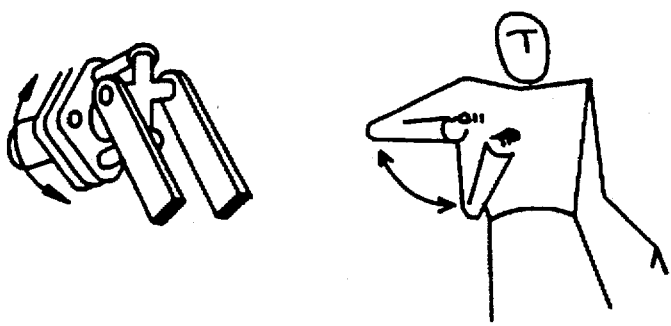
Figure 4B:
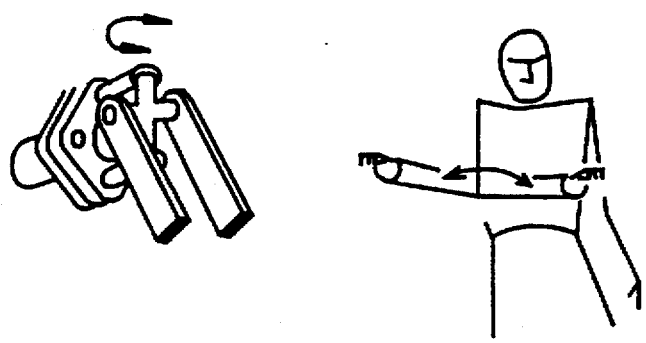
Figure 4C:
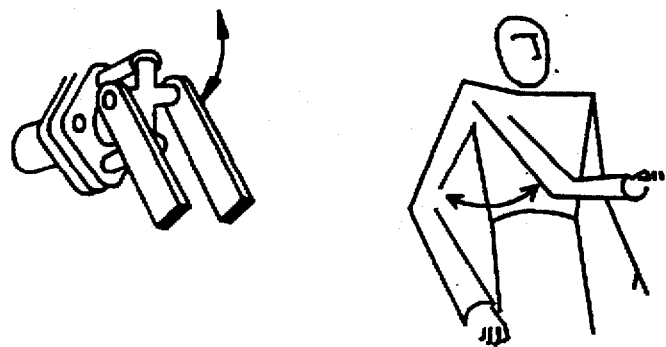

FIG. 4A, B, C shows how the mechanical shoulder traces the action of a human shoulder.

Figure 5:
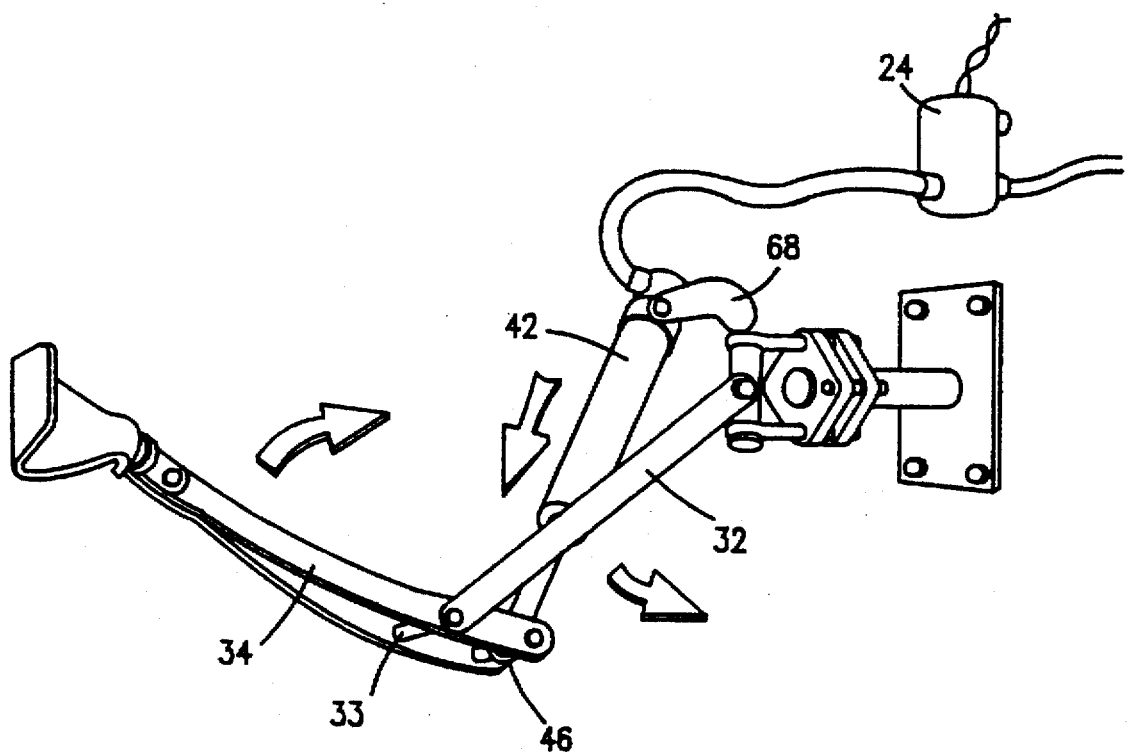

FIG. 5 shows the action of the interface arm.

Figure 6:
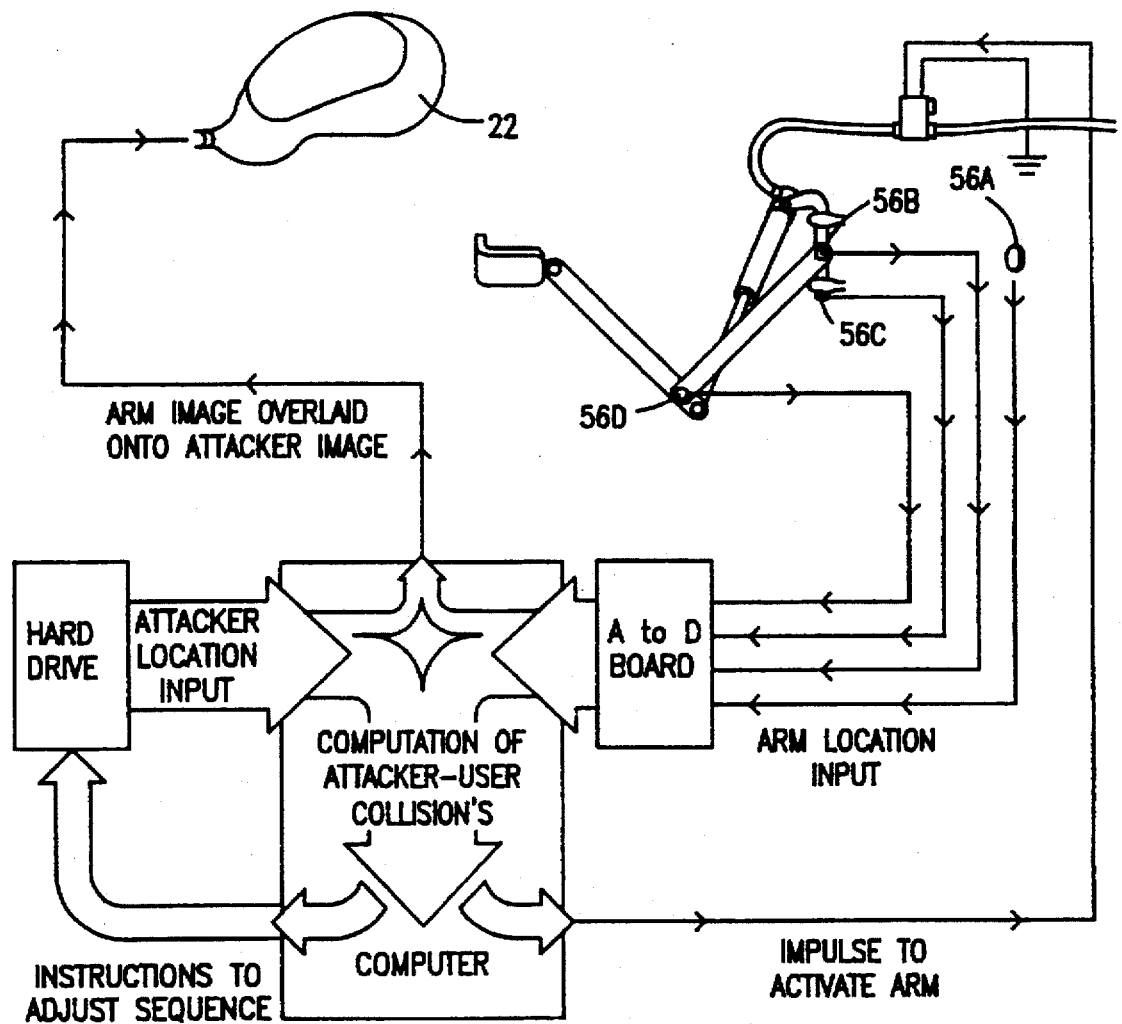

FIG. 6 shows the computer integrated with the interface system.

REFERENCE NUMERALS IN DRAWINGS

Figure 1:
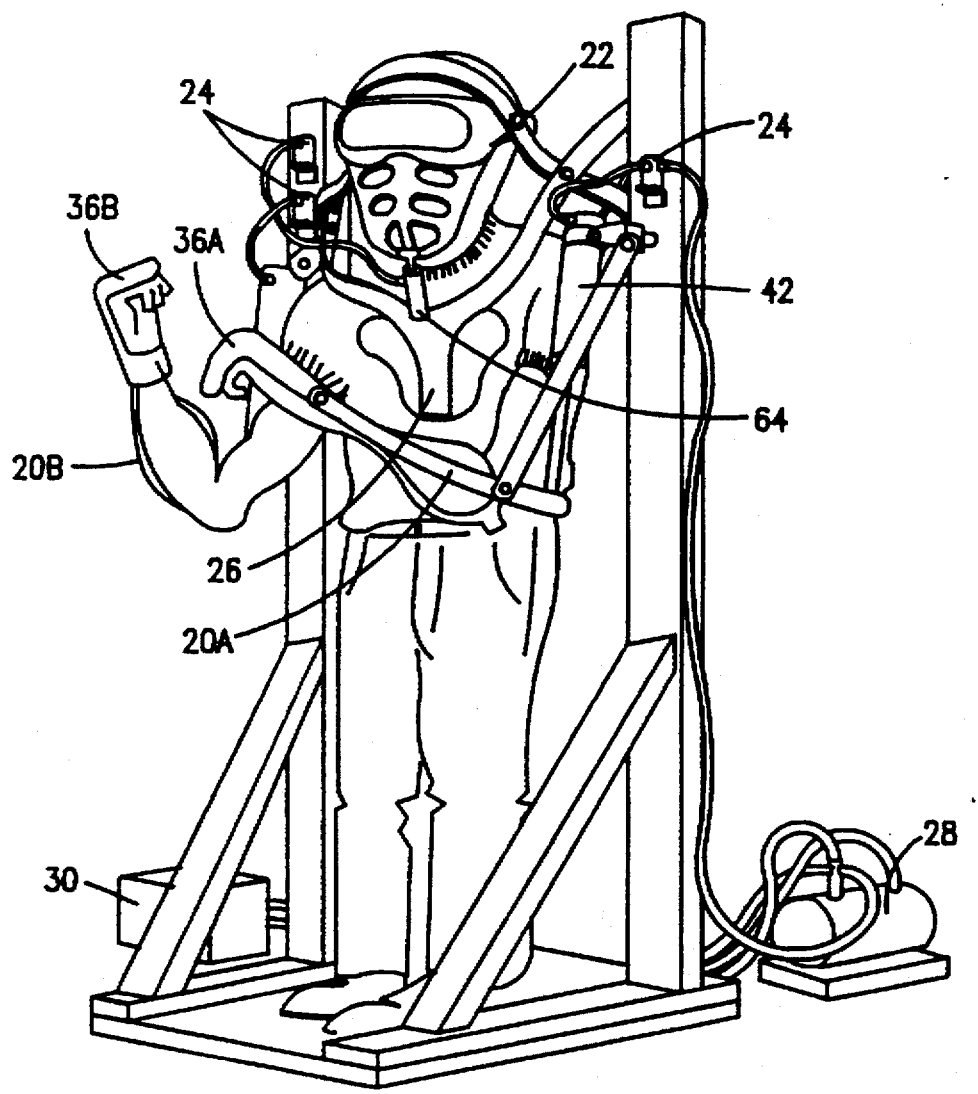
FIG. 1 shows the overall interactive system.
Figure 2:
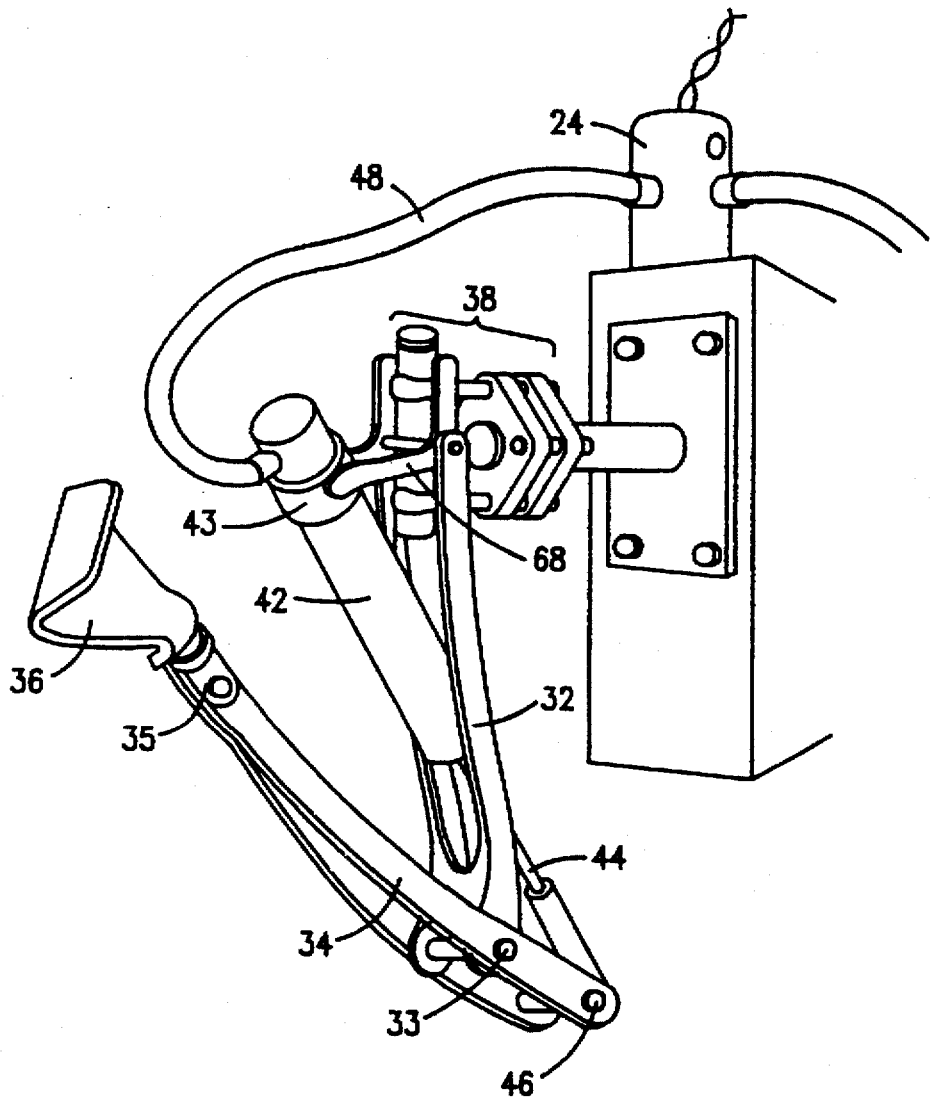
FIG. 2 shows the interface arm.
Figure 3:
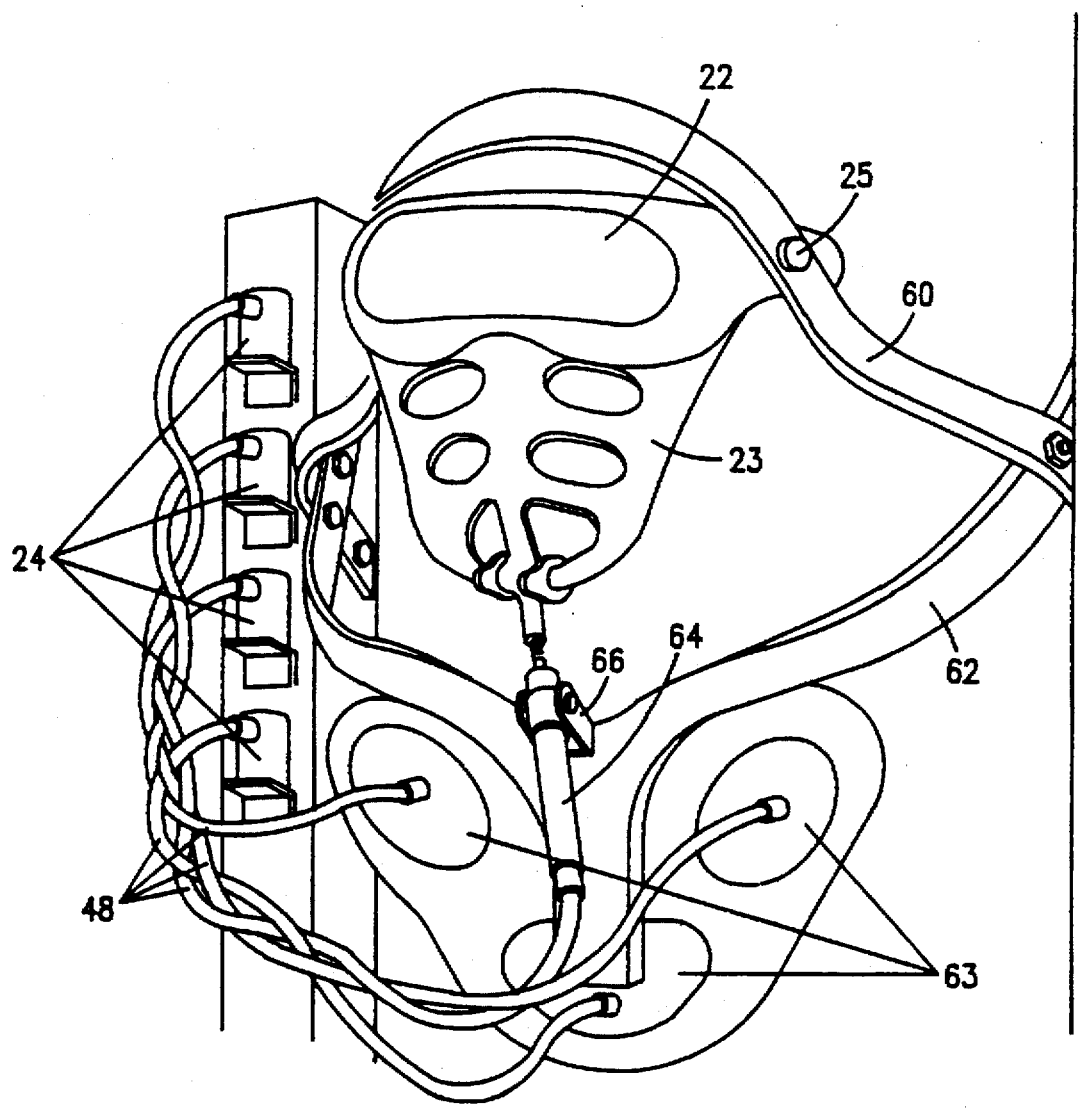
FIG. 3 shows in detail the face and chest assembly of the interface system.

20A—Interface arm, left
20B—Interface arm, right
22—Video goggles
23—Face protector
24—Solenoid activated air valves
25—Face assembly hinge pins
26—Chest restraint
28—Compressor
30—Computer (CPU)
32—Upper arm
33—Elbow hinge shaft
34—Forearm
35—Wrist swivel
36—Fist cup
38—Shoulder apparatus
40—Anchored shaft
41—Shaft collar
42—Pneumatic cylinder
43—Trunion mount
44—Pneumatic cylinder rod
46—Elbow fulcrum mounting pin
48—Air supply hose
50A, B—Flange bearings
52A, B—Rod ends
54—t-shaft
55—Shaft collar
A, B, C, D—Potentiometers
57A, B, C, D—Potentiometer mounting straps
60—Anchored head restraint
62—Anchored chest restraint
63—Air bladders
64—Pneumatic cylinder
66—Clevis mount
68—Shoulder cylinder offset tang
70—AD Board
72—Hard drive Description—FIGS. 1 to 3

FIG. 1 shows one of the possible interface mechanisms hooked up to its computer and air supply. In this application, the user steps up to the interface mechanism, pressing his or her chest against an anchored chest restraint (26) and places their face into a head device which includes display means comprising video goggles (22). The user places each hand in a fist cup (36) at the end of an interface arm (20). As can be seen from FIG. 1, the input arms (20) are coupled to a mounting means which in this case comprises a support structure (18). Processing means, in this case a computer (30) receives input regarding the location of the user's arms and sends output signals to solenoid activated valves (24). These valves control the power to pistons (42 & 64) which create the physical feedback sensed by the user. A compressor (28) in this example supplies air to drive the pistons. Although this example is powered by pneumatic pistons, the system could operate equally well using hydraulic pistons or electric servo motors.

FIG. 2 shows the arm in greater detail. For purposes of conciseness, only one of the interface arms (20) will be described. It will be appreciated from FIG. 1 that this embodiment of the invention comprises two interface arms (20) which correspond to left and right human arms. For purposes of this specification, the two interface arms (20) and their components will therefore be distinguished from one another by the use of the terms "left" and "right". The mechanical shoulder (38) is mounted on an anchored shaft (40). The upper arm (32) is connected to the shoulder which provides three degrees of rotational freedom as will be shown in detail in FIG. 2a. The forearm (34) is connected to the upper arm by the elbow hinge shaft (33) which allows one degree of rotational freedom. The fist cup (36) is connected to the forearm via the wrist swivel (35) which allows a limited degree of pivoting in any direction. A pneumatic cylinder (42) is connected via a trunion mount to an offset tang (68) which is, in turn, connected to the shoulder. The pneumatic cylinder's rod (44) is connected to the elbow fulcrum mounting pin (46). An air supply hose (48) runs to the pneumatic cylinder from a solenoid activated pneumatic valve (24).

Figure 2A:
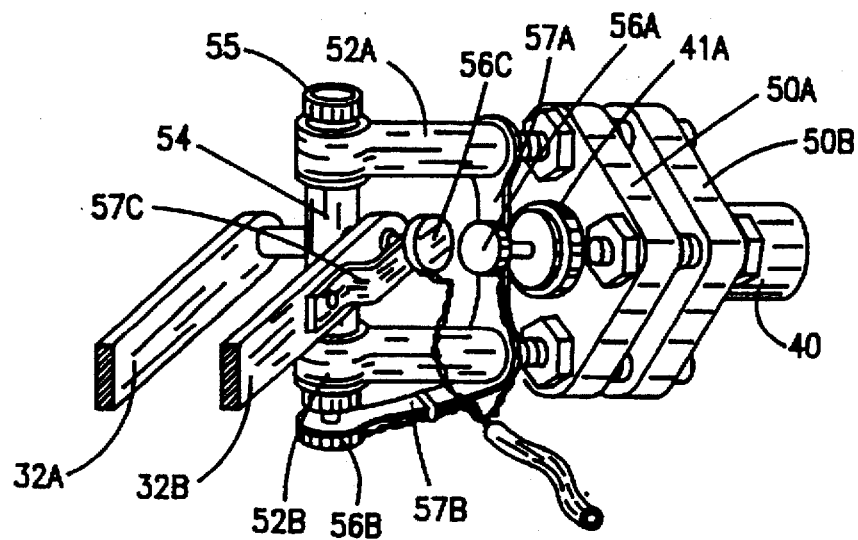
FIG. 2A shows in detail the shoulder of the interface arm.

FIG. 2A shows the mechanical shoulder in detail. For simplicity, the pneumatic cylinder and mounts are not shown. Two flange bearings (50) are fitted over an anchored steel shaft (40) and bolted together so that they rotate freely on the steel shaft. A shaft collar (41) keeps the bearings from sliding off the shaft. The body of a potentiometer (56A) is connected to a thin metal strap (57A) which is in turn connected to opposing flange bearing bolts. The shaft of the potentiometer is fixed to the anchored shaft. Rod ends (52A & B) are threaded onto opposing flange bearing bolts. A universal joint type t-shaped shaft (54) is fitted into these rod ends, to rotate freely and held in place by a shaft collar (55). This second degree of rotational freedom is measured by a potentiometer (56B). The shaft of this potentiometer is fixed to the vertical member of the t-shaped shaft, while it body is fixed via a thin metal strap (57B) to the shaft collar. The upper arm members of the interface arm (32A&B) are fitted to rotate freely on the cross members of the t-shaped shaft. This third degree of rotational freedom is measured by a potentiometer (56C) whose body is fixed to the upper arm via a thin metal strap (57C) and whose shaft is fixed to the cross member of the t-shaped shaft. Optical encoders or other sensing devices could equally be used to measure rotation in these joints.

Figure 2B:
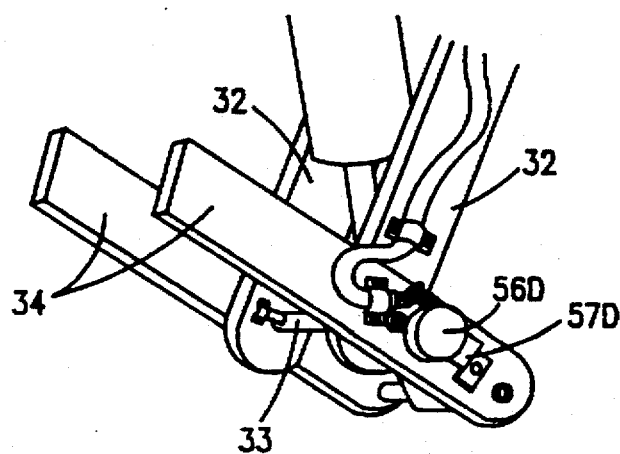
FIG. 2B shows in detail the elbow of the interface arm.

FIG. 2B shows the elbow detail where the forearm rotates on a shaft fixed to the upper arm. A potentiometer (56D) is connected to the forearm via a thin metal strap (57D) while its shaft is fixed to the arm's elbow hinge shaft (33).

FIG. 3 shows in detail the face and chest assembly of the interface system. The video goggles (22) and the face protector (23) are mounted together on two pivoting hinge pins (25) to a rigid anchored head restraint (60). The face protector is attached to a face assembly actuating means comprising a smaller pneumatic cylinder (64) whose body is attached via a clevis mount (66) to the rigid anchored chest restraint (62). When the cylinder is activated, it forces the face protector and video goggle assembly to slightly but suddenly pivot on the assembly's hinge pin. The chest restraint (62) is fitted with contact means, in this case air bladders (63) which contact the user's torso when inflated. Air supply hoses (48) run to the air bladders from solenoid operated air valves (24).

Operation—FIGS. 2, 4, 5, 6

FIG. 6—EXAMPLE GAME

FIG. 6 shows a schematic diagram of the operation of the interface in conjunction with a computer. In this example, we use a physical combat game for simplicity because this sort of game entails no digital delineation and therefor requires the least sophisticated interface system. The user places their arms in the mechanical interface arms. Information regarding the location of the arms is translated into voltage by the potentiometers (56A, B, C, D). Voltage from the potentiometers is transmitted to an AD board where it is translated into digital information. The computer uses this digital information to calculate the users arm position in virtual space (virtual environment). The computer creates an image of the users arm from the users perspective.

At the same time that information concerning the users arms is being transmitted to the computer, a prerecorded image of an attacker is being transmitted to the computer from the hard drive. This attacker image is shot from the perspective of a person being attacked. The computer overlays its image of the users arms onto the image of the attacker and sends this combined image to the video goggles.

In addition, the computer combines 3D information of the attacker location with 3D information of the user's arm, head and body location. With this information, it calculates collisions in virtual space between the user and attacker, and reacts depending on the type of collision that occurs. If the attacker hits the user's fists, a blow is felt in the fists. If the attacker hits the users face, blow is felt in face. Enough blows will cause the user to see stars, blur/double their vision, cause an eye to "swell shut" and finally to "black out" whereupon the game ends. If the user hits the attacker in the body or hands, the blow is felt by the user. If the user hit the attacker in the face blow is felt and the attacker reacts through a video switch on the hard drive to a progressive sequence: reels, recovers and comes back harder. Thus the attack cycle begins again and continues until the user again hits the attacker, interrupting the cycle once more. A skillful user may succeed in forcing the computer to switch hard drive sequences so rapidly that the computer can no longer keep up with operator inputs in real time. When this happens, the computer instructs the hard drive to play a sequence showing the attacker to be knocked out and lying unconscious on the floor while the computer resets to a more challenging attack sequence which shows the attacker rising from the floor.

FIG. 2, 4—HOW THE ARM SENSES USER POSITION

An important innovation of our tactile interface is its ability to smoothly trace or duplicate limb movement, enabling the computer to record and reproduce the user's body in virtual space while leaving the user free to move naturally. In order to trace human motion, an interface must provide more degrees of freedom than the three necessary to define a point in three dimensional space. For example, there are three degrees of freedom in the human shoulder alone. The three degrees of human shoulder rotation shown in FIG. 4A, B, & C correspond to the three degrees of mechanical rotation measured by the potentiometers (56A, B & C) shown in the shoulder detail FIG. 2A. These three degrees of freedom are required to allow the mechanical upper arm to ride smoothly along the upper arm of the user and trace its motion. Although not shown here, this same approach is used to trace other body motions.

FIG. 5—HOW THE ARM CONVEYS FEELINGS

When the pneumatic cylinder (42) is activated by the solenoid valve (24) the rod extends downward. This force acts in two ways. It's pressure on the elbow fulcrum mounting pin (46) causes the forearm (34) to flex. In addition, because the body of the cylinder is offset forwards from the pivot of the upper arm at the shoulder by the shoulder offset tang (68), the cylinder rod's extension forces the upper arm to pivot backward. These combined actions force the fist cup directly back towards the shoulder, resulting in the appearance of a blow or impact from straight ahead. The intensity of the force can be controlled by changing the duration of the solenoid's activation. A quick impulse applied while the users fist is moving forwards causes a sensation of hitting something while an impulse when the users hands are at rest results in a sensation of being hit. One alternative method of controlling the force of the apparent impact in the pneumatic model is by means of an electropneumatic transducer to control the pressure of air activating the cylinder. In the case of electric servo motors, the force can be varied by varying the voltage applied to the motors.

Summary, Ramifications, and Scope

Thus the reader will see that the tactile interface system provides tactile feedback in a way that is convincing in that there is no perceivable delay and the simulated interaction with the virtual world is realistically conveyed. The system provides for the ability to store tactile sequence along with images and sounds. Moreover, it enables the user to control the virtual world through the sense of touch. This provides for a far more realistic virtual reality device than those currently available such as video games which limit the user to sight and sound experiences of an artificial world, but leave the user tactily blind.

In the above description, we have chosen a combat video game to illustrate one of the simplest applications of the tactile interface system. While the above description contains many specifications, these should not be construed as limitations on the scope of the invention, but rather as an exemplification of one preferred embodiment thereof. Many other variations are possible. For example, the effect of the pneumatic pistons could be replaced by electric servo motors or any other mechanical force providing device capable of achieving the desired effect. Accordingly, the scope of the invention should be determined not by the embodiment(s) illustrated, but by the appended claims and their legal equivalents.

We claim:

1. Tactile interface apparatus comprising:

a mounting means;

a left interface arm comprising a left upper arm and a left forearm, the left interface arm for providing physical feedback to a left human arm, the left upper arm and the left forearm being coupled to one another for rotation about a left elbow hinge;

a right interface arm comprising a right upper arm and a right forearm, the right interface arm for providing physical feedback to a right human arm, the right upper arm and the right forearm being coupled to one another for rotation about a right elbow hinge;

a left mechanical shoulder rotatably coupling the left interface arm to the mounting means, the left mechanical shoulder permitting rotation of the left upper arm with respect to the mounting means about a left shoulder pivot;

a right mechanical shoulder rotatably coupling the right interface arm to the mounting means, the right mechanical shoulder permitting rotation of the right upper arm about a right shoulder pivot;

left actuating means being operable in response to a left output signal to cause rotation of the left forearm relative to the left upper arm, and simultaneously to cause rotation of the left upper arm relative to the mounting means, thereby to exert forces on the left human arm in use;

right actuating means being operable in response to a right output signal to cause rotation of the right forearm relative to the right upper arm, and simultaneously to cause rotation of the right upper arm relative to the mounting means, thereby to exert forces on the right human arm in use;

sensing means for providing input signals representative of the relative locations of the left forearm, the left upper arm and the mounting means, and representative of the relative locations of the right forearm, the right upper arm and the mounting means; and processing means for providing a virtual environment and for determining an interaction of the human operator with the virtual environment in use, the interaction being determined from the virtual environment and the input signals, the processing means further providing the left and right output signals to the left and right actuating means respectively based on said determined interaction, thereby to exert forces on the left and right human arms in use.

2. Tactile interface apparatus according to claim 1 wherein the left actuating means comprises linear actuating means which acts between a point on the left forearm which is offset from the left elbow hinge and a point on the left mechanical shoulder which is offset from the left shoulder pivot; and the right actuating means comprises linear actuating means which acts between a point on the right forearm which is offset from the right elbow hinge and a point on the right mechanical shoulder which is offset from the right shoulder pivot.

3. Tactile interface apparatus according to claim 1 wherein the sensing means comprises:

a left elbow angle measuring means for providing a left elbow input signal to the processing means, the left elbow input signal being proportional to an angle between the left upper arm and the left forearm;

a right elbow angle measuring means for providing a right elbow input signal to the processing means, the right elbow input signal being proportional to an angle between the right upper arm and the right forearm;

a left shoulder angle measuring means for providing a left shoulder input signal to the processing means, the left elbow input signal being proportional to an angle between the left upper arm and the mounting means; and a right shoulder angle measuring means for providing a right shoulder input signal to the processing means, the right shoulder input signal being proportional to an angle between the right upper arm and the mounting means;

the processing means determining an interaction of the human operator with the virtual environment in use, the interaction being determined from the virtual environment and the left and right shoulder and elbow input signals, the processing means further providing the left and right output signals to the left and right actuating means respectively based on said determined interaction.

4. Tactile interface apparatus according to claim 3 further comprising a face assembly comprising a face protector and display means, the display means for providing an image of the virtual environment.

5. Tactile interface apparatus according to claim 4 further comprising:

a chest restraint for corresponding to a human chest, the face assembly being rotatable relative to the chest restraint; and face assembly actuating means being operable to rotate the face assembly relative to the chest restraint.

6. Tactile interface apparatus according to claim 4 further comprising:

a chest restraint for corresponding to a human chest, the chest restraint including contact means being operable to contact the human chest.

7. Tactile interface apparatus according to claim 4 wherein:

the processing means provides a display signal to the display means in use, the display means providing output which includes an image of the left and right human arms from a user's perspective.

8. Tactile interface apparatus according to claim 3 further comprising left and right fist cups being coupled to the left and right forearms respectively, the left and right fist cups for corresponding to left and right human hands respectively.

9. Tactile interface apparatus according to claim 3 wherein the left and right actuating means are selected from the group consisting of pneumatic cylinders, hydraulic cylinders and electric servo motors.

10. Tactile interface apparatus comprising:

a mounting means;

an interface arm comprising an upper arm and a forearm, the interface arm for providing physical feedback to a human arm, the upper arm and the forearm being coupled to one another for rotation about an elbow hinge;

a mechanical shoulder rotatably coupling the interface arm to the mounting means, the mechanical shoulder permitting rotation of the upper arm with respect to the mounting means about a shoulder pivot;

linear actuating means being operable in response to an output signal to cause rotation of the forearm relative to the upper arm, and simultaneously to cause rotation of the upper arm relative to the mounting means, thereby to exert forces on the human arm in use, the actuating means acting in use between a point on the forearm which is offset from the elbow hinge and a point on the mechanical shoulder which is offset from the shoulder pivot;

an elbow angle measuring means for providing an elbow input signal proportional to an angle between the upper arm and the forearm;

a shoulder angle measuring means for providing a shoulder input signal proportional to an angle between the upper arm and the mounting means; and processing means for providing a virtual environment and for providing the output signal to the actuating means;

the processing means determining an interaction of the human operator with the virtual environment, the interaction being determined from the virtual environment and the shoulder and elbow input signals, the processing means further providing the output signal to the actuating means based on said determined interaction, thereby to exert forces on the human arm in use.

11. Tactile interface apparatus according to claim 10 further comprising a face assembly comprising a face protector and display means, the display means for providing an image of the virtual environment.

12. Tactile interface apparatus according to claim 11 further comprising:

a chest restraint for corresponding to a human chest, the face assembly being rotatable relative to the chest restraint; and face assembly actuating means being operable to rotate the face assembly relative to the chest restraint.

13. Tactile interface apparatus according to claim 10 further comprising:

a chest restraint for corresponding to a human chest, the chest restraint including contact means being operable to contact the human chest.

14. Tactile interface apparatus according to claim 11 wherein:

the processing means provides a display signal to the display means in use, the display means providing output which includes an image of the human arm from a user's perspective.

15. Tactile interface apparatus according to claim 11 further comprising a fist cup being coupled to the forearm, the fist cup for corresponding to a human hand.

16. Tactile interface apparatus according to claim 10 wherein the actuating means is selected from the group consisting of pneumatic cylinders, hydraulic cylinders and electric servo motors.

* * * * *